US012645845B2

(12) United States Patent
Rodriguez Bravo

(10) Patent No.: US 12,645,845 B2
(45) **Date of Patent: \*Jun. 2, 2026**

(54) GATHERING UNIVERSAL SERIAL BUS THREAT INTELLIGENCE

(71) Applicant: Kyndryl, Inc., New York, NY (US)

(72) Inventor: Cesar Augusto Rodriguez Bravo, Alajuela (CR)

(73) Assignee: Kyndryl, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/784,334

(22) Filed: Jul. 25, 2024

(65) Prior Publication Data

US 2024/0378323 A1 Nov. 14, 2024

Related U.S. Application Data

(63) Continuation of application No. 17/509,228, filed on Oct. 25, 2021, now Pat. No. 12,079,378.

(51) Int. Cl.
G06F 21/82 (2013.01)
G06F 13/38 (2006.01)
(Continued)

(52) U.S. Cl.
CPC ............ G06F 21/82 (2013.01); G06F 13/385 (2013.01); G06F 21/556 (2013.01);
(Continued)

(58) Field of Classification Search
CPC .... G06F 21/577; G06F 13/385; G06F 21/554; G06F 21/53; G06F 21/82; G06F 21/556;
(Continued)

(56) References Cited

U.S. PATENT DOCUMENTS 7,721,115 B2 5/2010 Luttmann et al.
8,386,795 B2 2/2013 Lu et al.
(Continued)

FOREIGN PATENT DOCUMENTS

CN 102314574 A 1/2012
CN 104462940 A 3/2015
WO 2019030748 A1 2/2019

OTHER PUBLICATIONS

Mell et al., "The NIST Definition of Cloud Computing", NIST, Special Publication 800-145, Sep. 2011, 7 pages.
(Continued)

*Primary Examiner* — Mohammad A Siddiqi
(74) *Attorney, Agent, or Firm* — Erik Swanson; Andrew D. Wright; Calderon Safran & Wright P.C.

(57) ABSTRACT

A method includes: detecting, by a computing device, connection of a universal serial bus device to a computer; determining, by the computing device, that the computer is in a locked mode; detecting, by the computer device, input to the computer within a predetermined time of detecting the connection; determining, by the computing device as a result of the computer being locked and detecting the input, that the input is a threat to the computer; creating, by the computing device, a temporary virtual environment; receiving, by the computing device, the input into the temporary virtual environment; processing, by the computing device, the input in the temporary virtual environment; and recording, by the computing device, information related to the input.

20 Claims, 5 Drawing Sheets

(51) Int. Cl.
  *G06F 21/55*        (2013.01)
  *G06F 21/57*        (2013.01)
(52) U.S. Cl.
  CPC .... *G06F 21/577* (2013.01); *G06F 2213/0042*
        (2013.01); *G06F 2221/2141* (2013.01)
(58) Field of Classification Search
  CPC ..... G06F 2213/0042; G06F 2221/2141; H04L
        63/1416; H04L 63/1425; H04L 63/1491
  See application file for complete search history.

(56)                References Cited

U.S. PATENT DOCUMENTS

|  |  |  |  |
|---|---|---|---|
| 8,387,141 | B1 | 2/2013 | Zhukov et al. |
| 9,596,264 | B2 * | 3/2017 | Sandke .................. H04L 63/101 |
| 10,642,980 | B1 | 5/2020 | Demsey et al. |
| 10,726,127 | B1 * | 7/2020 | Steinberg .............. G06F 21/566 |
| 11,514,321 | B1 | 11/2022 | Chen et al. |
| 11,671,422 | B1 | 6/2023 | Salehpour et al. |
| 2006/0021029 | A1 * | 1/2006 | Brickell ................... G06F 21/51 |
|  |  |  | 726/22 |
| 2006/0021034 | A1 | 1/2006 | Cook |
| 2006/0184806 | A1 | 8/2006 | Luttmann et al. |
| 2007/0208949 | A1 | 9/2007 | Lu et al. |
| 2010/0250497 | A1 | 9/2010 | Redlich et al. |
| 2013/0203023 | A1 | 8/2013 | Sadeh-Koniecpol et al. |
| 2013/0232576 | A1 * | 9/2013 | Karnikis ................. G06F 21/53 |
|  |  |  | 726/24 |
| 2015/0106889 | A1 * | 4/2015 | Sharabani ............... G06F 16/95 |
|  |  |  | 726/5 |
| 2015/0261955 | A1 | 9/2015 | Huang et al. |
| 2016/0080414 | A1 * | 3/2016 | Kolton ................ H04L 63/1491 |
|  |  |  | 726/23 |
| 2016/0308895 | A1 | 10/2016 | Kotler et al. |
| 2017/0220823 | A1 | 8/2017 | Law et al. |
| 2017/0223039 | A1 * | 8/2017 | Mont ...................... H04L 41/40 |
| 2019/0121962 | A1 | 4/2019 | Coleman et al. |
| 2020/0076837 | A1 | 3/2020 | Ladnai et al. |
| 2020/0285761 | A1 | 9/2020 | Buck et al. |
| 2020/0358818 | A1 | 11/2020 | Stoletny et al. |
| 2021/0397711 | A1 | 12/2021 | Karr |
| 2022/0094713 | A1 | 3/2022 | Lee et al. |
| 2022/0368699 | A1 * | 11/2022 | Thomson .............. H04L 63/104 |
| 2023/0011004 | A1 * | 1/2023 | Fellows .............. H04L 63/1425 |
| 2023/0085401 | A1 | 3/2023 | Deng et al. |

OTHER PUBLICATIONS

Dave Jing Tian et al., "Defending Against Malicious USB Firmware with GoodUSB", ACSAC 2015, Dec. 2015, 10 pages.
Sebastian Angel et al., "Defending against malicious peripherals with Cinch", SEC'16: Proceedings of the 25th USENIX Conference on Security Symposium, Aug. 2016, 19 pages.
Unknown, "Device Class Definition for Human Interface Devices (HID)", https://www.usb.org/hid, 5 pages.
Wikipedia, "USB human interface device class", https://en.wikipedia.org/wiki/USB_human_interface_device_class, 5 pages.
Anton 'ant' Zhukov, "Turning a Regular USB Flash Drive into a USB Rubber Ducky", https://hackmag.com/security/rubber-ducky/, 1 page.
Unknown, "Bad USB, Very Bad USB", https://www.lmgsecurity.com/bad-usb-very-bad-usb/, LMG Security Blog, May 2, 2016, 5 pages.
HAK5 LLC, "USB Rubber Ducky", https://shop.hak5.org/products/usb-rubber-ducky-deluxe, downloaded Oct. 21, 2021, 5 pages.
Adam Eaton, "Building a USB Rubber Ducky for $7", https://medium.com/@EatonChips/building-a-usb-rubber-ducky-for-7-c851aae30a1d, Aug. 7, 2017, 9 pages.
Hartley Brody, "USB Rubber Ducky Tutorial: The Missing Quickstart Guide to Running Your First Keystroke Payload Hack", https://blog.hartleybrody.com/rubber-ducky-guide/, Aug. 29, 2017, 11 pages.
Unknown, "USB-Rubber-Ducky-Clone-using-Arduino-Leonardo-Beetle", https://github.com/basic4/USB-Rubber-Ducky-Clone-using-Arduino-Leonardo-Beetle, 2 pages.
Unknown, "Make your own DIY USB Rubber Ducky", https://behindthesciences.com/electronics/make-your-own-diy-usb-rubber-ducky/, May 12, 2017, 11 pages.
Djordje Atlialp, "Snagging creds from locked machines", https://malicious.link/post/2016/snagging-creds-from-locked-machines/, published Sep. 6, 2016, 9 pages.
Corey Nachreiner, "USB Lock Screen Bypass—Daily Security Byte", https://www.secplicity.org/2016/09/12/usb-lock-screen-bypass-daily-security-byte/, Sep. 12, 2016, 6 pages.
SandUSB: An installation-free sandbox for USB peripherals; Edwin Lupita Loe, Hsu-Chun Hsiao, Tiffany Hyun-Jin Kim, Shao-Chuan Lee, Shin-Ming Cheng; Department of Computer Science and Information Engineering, National Taiwan University, 2016 IEEE 3rd World; 2016; pp. 621-626.
List of Kyndryl Patents or Patent Applications Treated as Related, dated Jul. 24, 2024, 2 pages.

\* cited by examiner

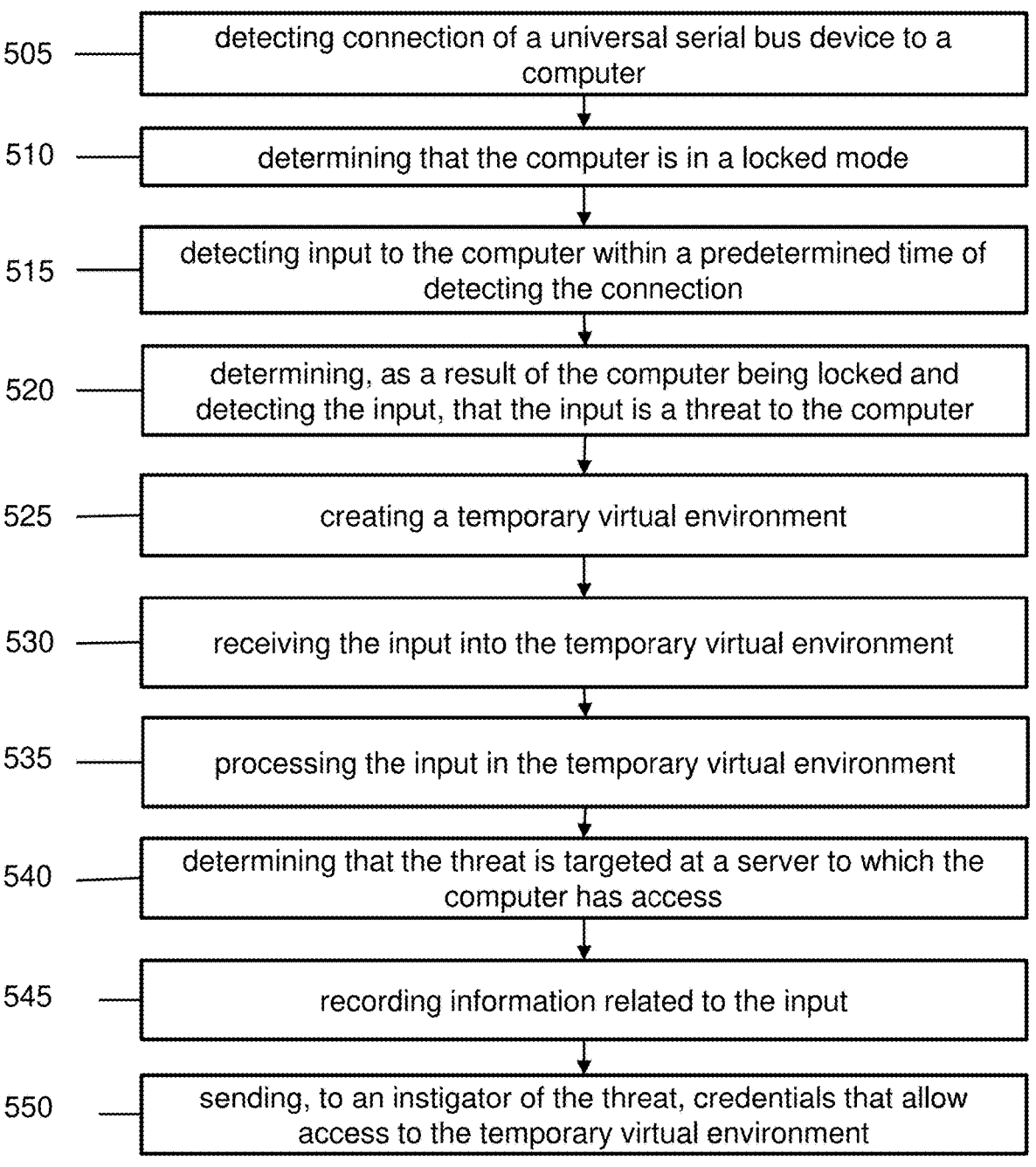

505 — detecting connection of a universal serial bus device to a computer

510 — determining that the computer is in a locked mode

515 — detecting input to the computer within a predetermined time of detecting the connection 520 — determining, as a result of the computer being locked and detecting the input, that the input is a threat to the computer 525 — creating a temporary virtual environment 530 — receiving the input into the temporary virtual environment 535 — processing the input in the temporary virtual environment 540 — determining that the threat is targeted at a server to which the computer has access 545 — recording information related to the input 550 — sending, to an instigator of the threat, credentials that allow access to the temporary virtual environment

FIG. 5

GATHERING UNIVERSAL SERIAL BUS THREAT INTELLIGENCE

BACKGROUND

Aspects of the present invention relate generally to computer security threats and, more particularly, to gathering intelligence regarding universal serial bus (USB) threats.

USB devices are commonly used with many computer systems. USB devices such as, for example, USB human interactive devices (HID) plug into a computer system or other computer device by way of a USB port. There are several common standard USB ports including USB A, USB B, USB C, USB OTG, Mini USB, Micro USB, and Lightning Cable. USB HID devices include memory sticks or drives, pointer devices, keyboards, printers, monitors, and other devices.

SUMMARY

In a first aspect of the invention, there is a computer-implemented method including: detecting, by a computing device, connection of a universal serial bus device to a computer; determining, by the computing device, that the computer is in a locked mode; detecting, by the computer device, input to the computer within a predetermined time of detecting the connection; determining, by the computing device as a result of the computer being locked and detecting the input, that the input is a threat to the computer; creating, by the computing device, a temporary virtual environment; receiving, by the computing device, the input into the temporary virtual environment; processing, by the computing device, the input in the temporary virtual environment; and recording, by the computing device, information related to the input.

In another aspect of the invention, there is a computer program product including one or more computer readable storage media having program instructions collectively stored on the one or more computer readable storage media. The program instructions are executable to: detect connection of a universal serial bus device to a computer; determine that the computer is in a locked mode; detect input to the computer within a predetermined time of detecting the connection; determine, as a result of the computer being locked and detecting the input, that the input is a threat to the computer; create a temporary virtual environment; receive the input into the temporary virtual environment; and process the input in the temporary virtual environment.

In another aspect of the invention, there is system including a processor, a computer readable memory, one or more computer readable storage media, and program instructions collectively stored on the one or more computer readable storage media. The program instructions are executable to: detect connection of a universal serial bus device to a computer; determine that the computer is in a locked mode; detect input to the computer within a predetermined time of detecting the connection; determine, as a result of the computer being locked and detecting the input, that the input is a threat to the computer; create a temporary virtual environment; receive the input into the temporary virtual environment; and process the input in the temporary virtual environment.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 5 shows a flowchart of an exemplary method in accordance with aspects of the invention.

DETAILED DESCRIPTION

Figure 1:
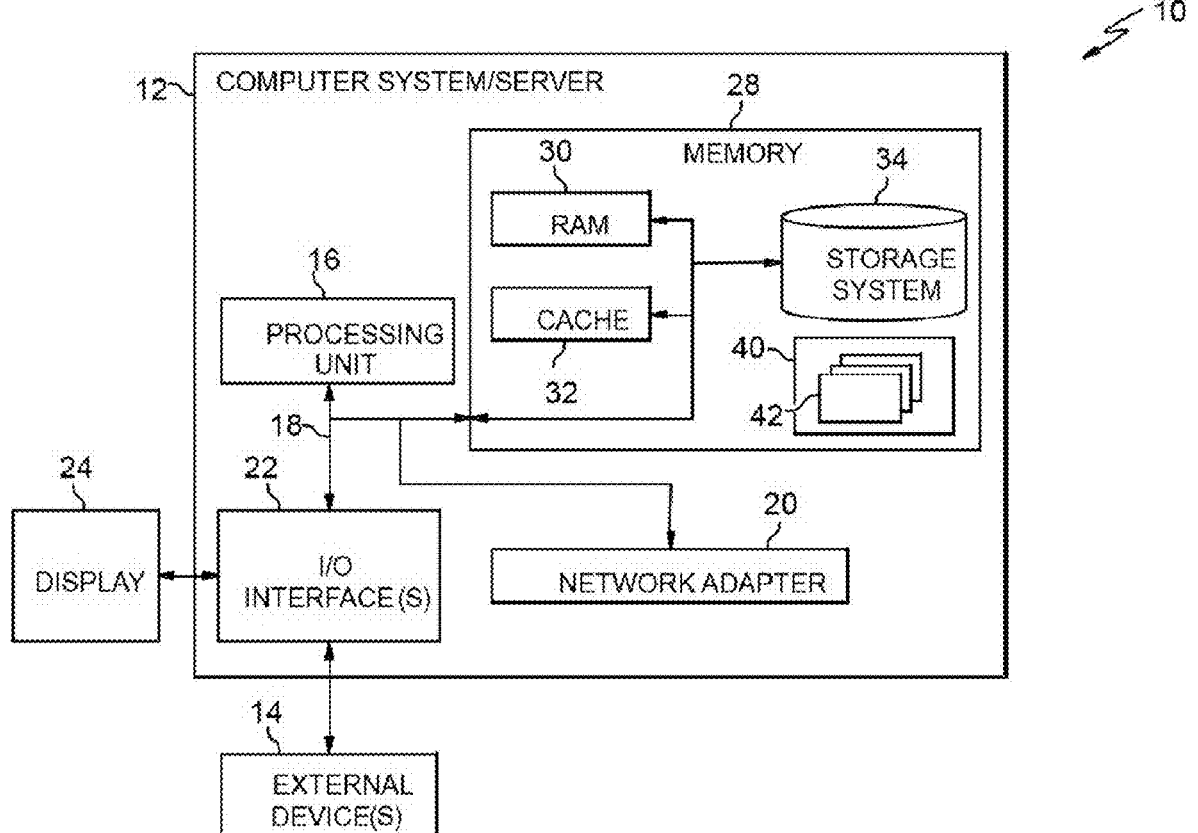
FIG. 1 depicts a cloud computing node according to an embodiment of the present invention.

Aspects of the present invention relate generally to computer security threats and, more particularly, to gathering intelligence regarding universal serial bus (USB) threats. According to aspects of the invention a computing device detects the connection of a USB device to a locked computer and creates a temporary virtual environment to monitor and record keystrokes and/or other input to determine if the computer is subject to a threat. In embodiments, the computing device receives the input into the temporary virtual environment, processes the input in the temporary virtual environment, and records information related to the input. In this manner, implementations of the invention reduce the computer's exposure to threats (attacks) through a USB port.

In embodiments, a computer-implemented process including a smart sandbox system (SSS) detects and gathers threat intelligence on a USB threat on a locked device. A sandbox is a virtual environment in which an application can be run without letting the application have access to a system that is being protected. In embodiments, the computer-implemented process includes: in response to monitoring a first device while powered on for an idle status, determining whether a USB HID is connected to the first device; in response to determining that the USB HID is connected to the first device, triggering deployment of a virtual environment on the first device; determining by the virtual environment that the USB HID represents a malicious USB threat by, in response to detecting by the virtual environment no keystroke activity, deleting the virtual environment; in response to detecting by the virtual environment keystroke activity, recording by the virtual environment all keystrokes; comparing by the virtual environment keystrokes against known attack information to determine presence of a known keystroke attack; recording by the virtual environment target specific data to determine whether the keystroke activity was one of a random attack using information including at least one of random and generic Internet protocol (IP) segments to target servers inside a particular organization and random user/password combinations, and a targeted attacked using information including at least one of IP addresses and names of servers to be targeted, and specific and valid user/ password combinations; recording by the virtual environment potential paths leading to possible unauthorized users using information including IP addresses where data was targeted to be sent, server names where the data was targeted to be sent and all credentials used; executing by the virtual environment the keystroke activity to determine a target of attack including when network commands are found, flagging as a network attack, when a delete action is detected, flagging as a data integrity attack and when an encryption action is detected, flagging as one of an availability attack and a ransomware attack; and sending by the virtual environment dummy data to the possible unauthorized user(s) to gather more threat intelligence data.

Embodiments of the invention provide improved computer protection methods and systems to address the technical problem of reducing unauthorized access to a computer through a USB port. Implementations of the invention provide new functionality enabling the continued use of "plug-n-play" devices connected to a computer's USB port while addressing security concerns with USB ports. Additionally, embodiments of the invention record information relating to a threat to the computer resulting from input received through the USB port.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
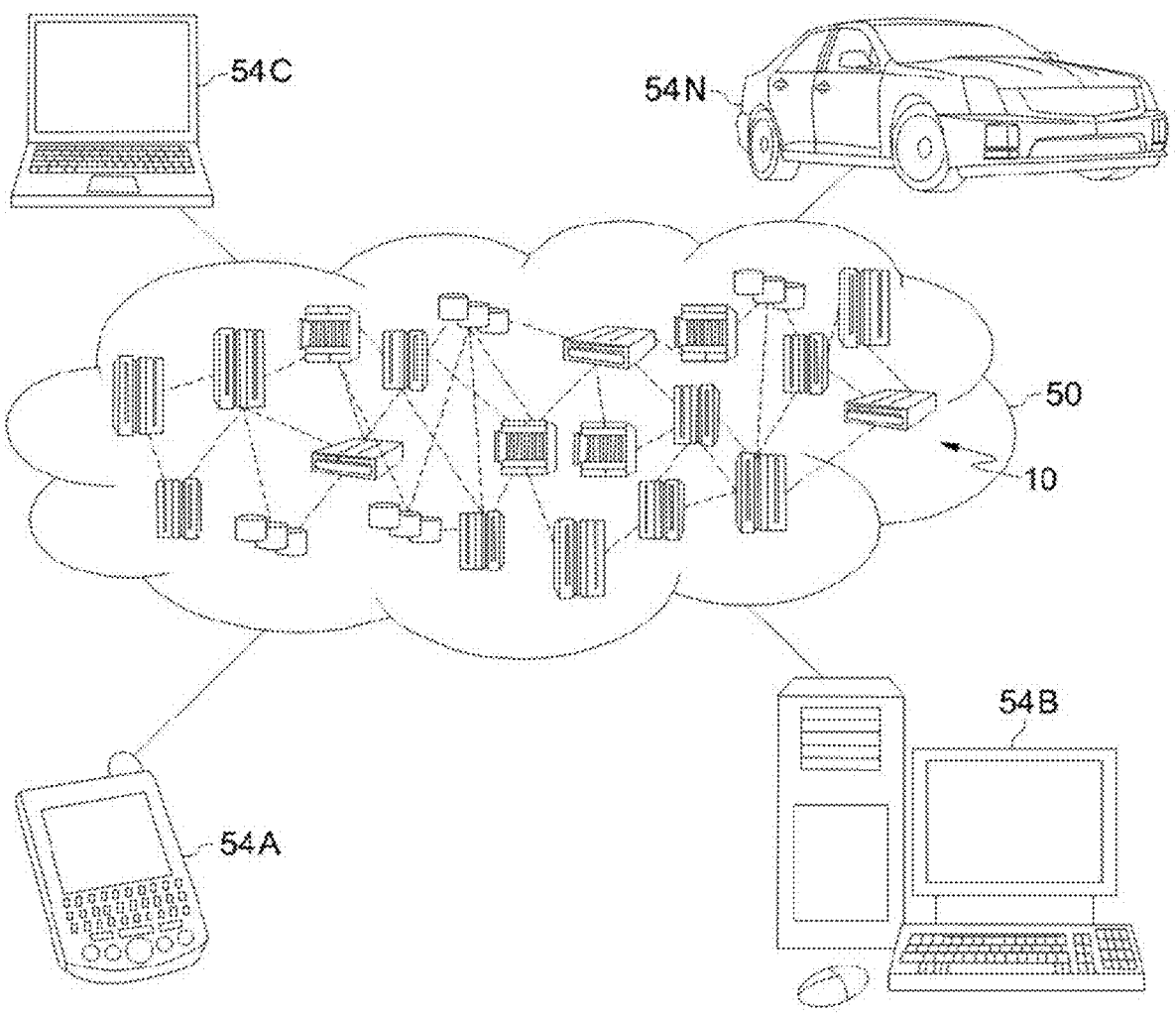
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
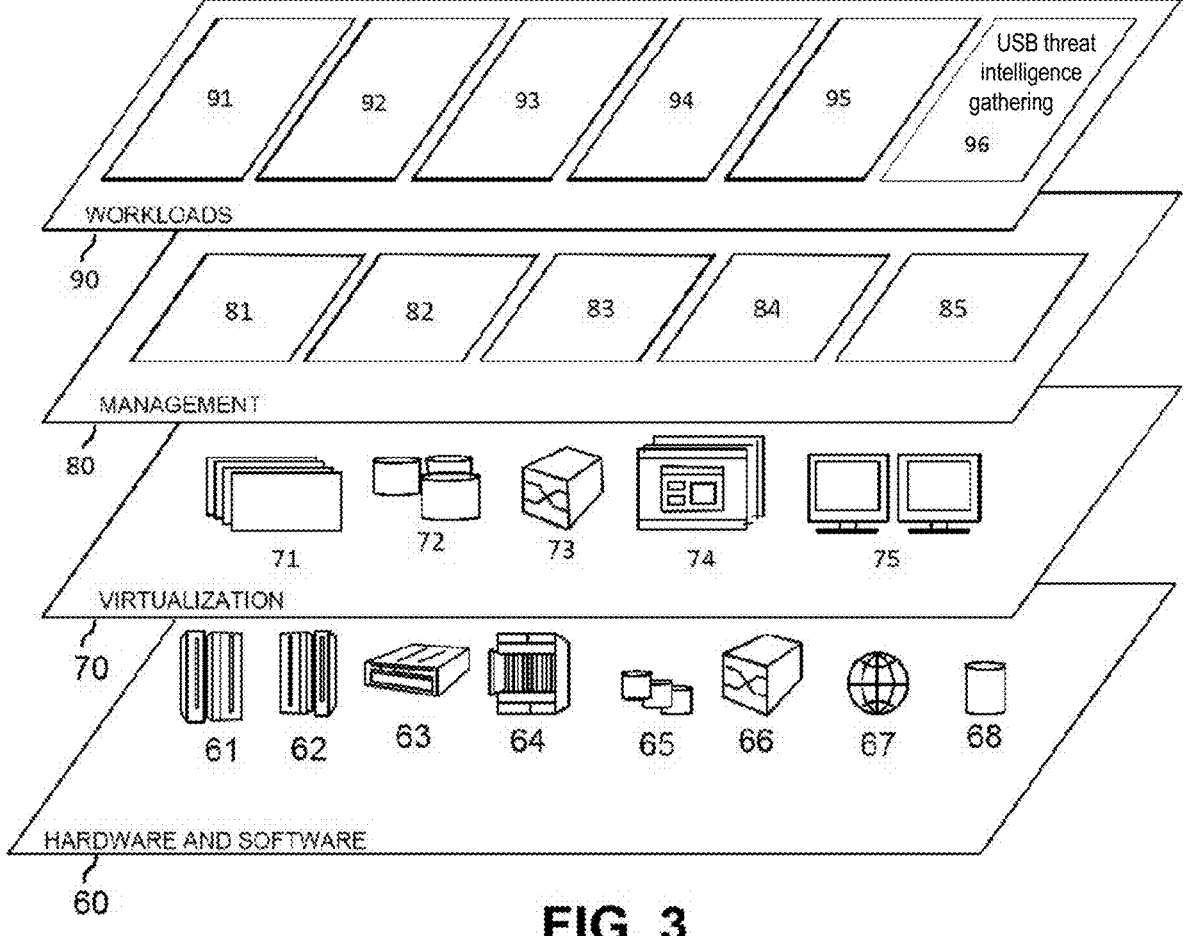
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and USB threat intelligence gathering 96.

Implementations of the invention may include a computer system/server 12 of FIG. 1 in which one or more of the program modules 42 are configured to perform (or cause the computer system/server 12 to perform) one of more functions of the USB threat intelligence gathering 96 of FIG. 3. For example, the one or more of the program modules 42 may be configured to: detect connection of a universal serial bus device to a computer; determine that the computer is in a locked mode; detect input to the computer within a predetermined time of detecting the connection; determine, as a result of the computer being locked and detecting the input, that the input is a threat to the computer; create a temporary virtual environment; receive the input into the temporary virtual environment; process the input in the temporary virtual environment; and record information related to the input.

Many USB HID such as, for example, memory sticks or drives, pointer devices, keyboards, printers, and monitors are universally accepted by computer systems and therefore provide a relatively simple access point for attacks on the computer system. A USB HID commonly tells the computer system what the USB HID is (a keyboard, etc.) and the computer system commonly believes what it receives from the USB HID to be valid. This provides an easy access point for unauthorized users to inject code into the computer system from a USB thumb drive because the computer system readily believes that the USB thumb drive is a keyboard or other benign device. Various threats leverage USB HID vulnerabilities to perform attacks on computer devices to which a USB HID is connected. Such attacks include executing malicious code, opening ports, and other attacks. Normally, a computer needs to be unlocked (logged in to) for a USB device to inject code into the computer to which the USB device is connected. However, unauthorized user's have found a way to strengthen USB attacks by allowing the malicious code to be injected even if the computer is locked. One way for an unauthorized user to perform such an attack is to connect a malicious USB device to a computer when the authorized user of the computer is away on a break, for example. In this situation, the computer is usually ON, but locked. One way to combat such attacks is to disable all USB ports, which results in inconvenience and wasted hardware in that useful USB devices can no longer be used.

Figure 4:
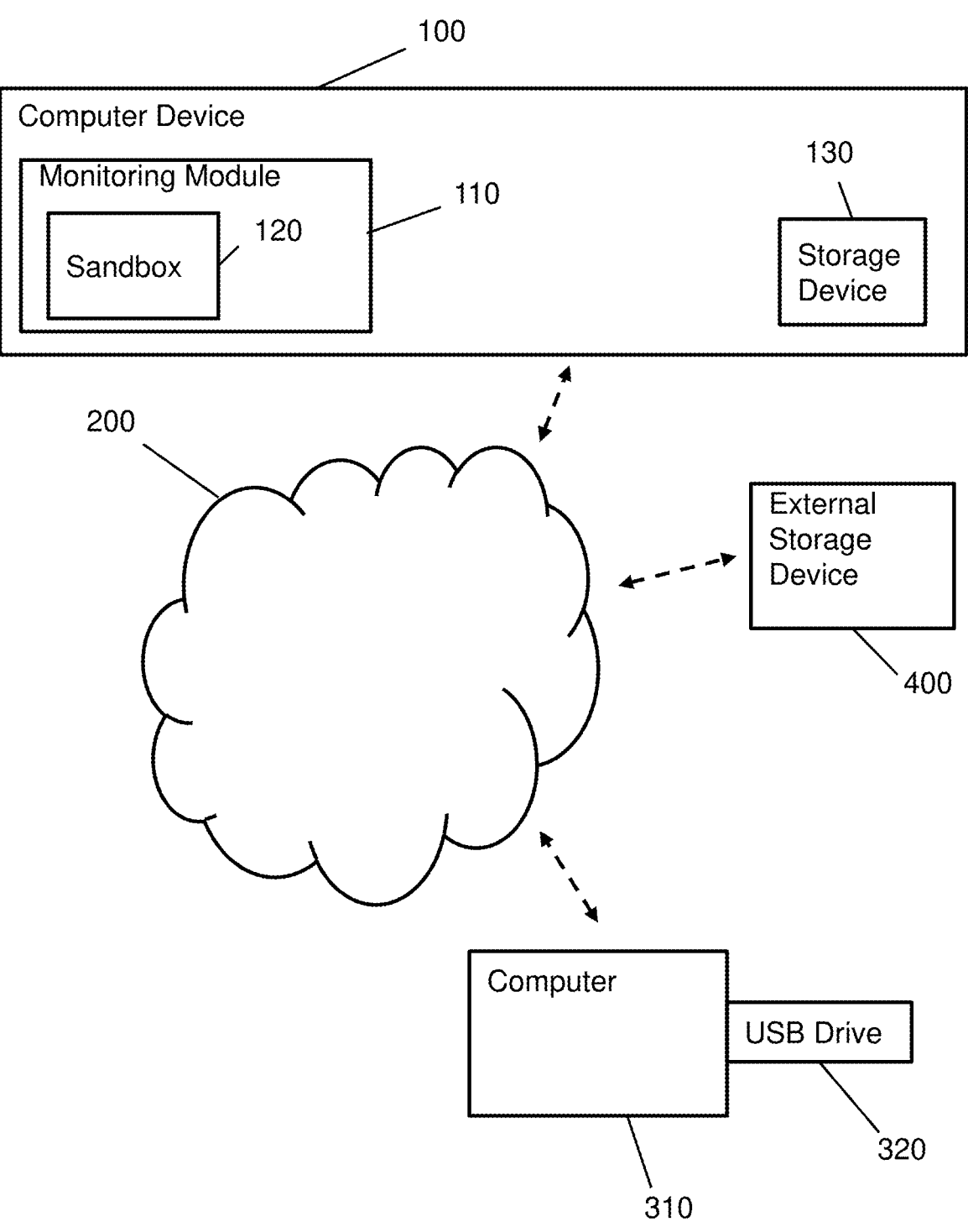
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 200 such as, for example, cloud computing environment 50 of FIG. 2. In embodiments, computer device 100 comprises a monitoring module 110 comprising, for example, one or more of program modules 42 in FIG. 1, and a storage device 130 such as, for example, storage system 34 in FIG. 1. In embodiments, monitoring module 110 includes a virtual environment (a sandbox), such as, for example, sandbox 120. In embodiments, storage device 130 contains data useful to monitoring module 110 such as for example, current information related to USB HID types, specifications, and formats. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

FIG. 4 also shows a computer 310 such as, for example, a personal computer or other computer connected to network 200. In embodiments, monitoring module 110 deploys sandbox 120 in computer 310 (described in more detail below). A USB drive 320 is shown connected to computer 310. FIG. 4 also shows an external storage device 400 such as, for example, another computer device having some or all of the features of computer system/server 12 in FIG. 1, that is external to computer device 100 and contains data useful to monitoring module 110 such as for example, current information related to USB HID types, specifications, and formats. In embodiments, storage device 130 and external storage devices 400 are accessed by monitoring module 110.

Embodiments of the invention are based on a monitoring module, for example monitoring module 110, that works when a device, for example computer 310, is ON but idle (locked) and detects whether a USB device, for example USB drive 320 is connected. In embodiments, the connection of USB drive 320 (or other USB device) to computer 310 when computer 310 is locked will trigger monitoring module 110 to deploy a virtual environment (a sandbox), such as, for example, sandbox 120, that is used by monitoring module 110 to determine if USB drive 320 is a malicious USB threat. In embodiments, if monitoring module 110 detects no keystroke from computer 310 within a certain period of time of the connection of USB drive 320, monitoring module 110 automatically deletes the virtual environment (sandbox 120) and computer 310 resumes normal operation. In embodiments, monitoring module 110 interprets the absence of keystrokes as evidence that no malicious threat exists.

In embodiments, monitoring module 110 deploys a smart and temporary virtual environment (sandbox 120) to gather threat intelligence about a potential USB attack. In embodiments, sandbox 120 receives input from the unauthorized user and processes that input in a similar manner to that of normal operation of computer 310. In embodiments, the unauthorized user is not able to distinguish operation of sandbox 120 from that of normal operation of computer 310. In embodiments, monitoring module 110 sends "dummy" credentials that appear to be from computer 310 (or a production server) but, instead, those credentials are for threat intelligence gathering sandbox 120. In examples, sandbox 120 records keystrokes entered by a potential unauthorized user that can be useful in identifying the unauthorized user, the location of the unauthorized user, methods used by the unauthorized user, and other information that can be useful to threat protection entities in combatting future attacks. In embodiments, monitoring module 110 sends fake salted hashed credentials disguised as production credentials aimed to waste the unauthorized user's time and resources (the unauthorized user will invest hours trying to solve the fake salted hashes that will ultimately have no use at all).

In embodiments, in response to monitoring module 110 detecting input such as a keystroke (a literal keystroke on a keyboard connected to computer 310 or a command from USB drive 320) from computer 310 within a certain time period of the connection of USB drive 320, monitoring module 110 deploys sandbox 120, and sandbox 120 records all keystrokes and performs some or all of the following five actions.

(1) In embodiments, monitoring module 110 compares the keystrokes against known attacks to determine if the keystrokes represent a known attack.

(2) In embodiments, monitoring module 110 records target specific data to determine if the attack is a random or targeted attacked. For example, if the data includes internet protocol (IP) segments, monitoring module 110 determines whether these IP segments are random (and/or generic) segments, or whether they include specific IP addresses or names of servers to which computer 310 has authorized access. If the IP segments include the specific IP addresses or names of the servers to be targeted, this is an indication that the attack involves someone with knowledge of the server names. As another example, if the data includes internet protocol (IP) segments, monitoring module 110 determines whether these IP segments include random user/password combinations, or whether they include specific (and valid) user/password combinations.

(3) In embodiments, monitoring module 110 records all trails that may lead to the unauthorized users by, for example: recording all IP addresses of targets to which the data was targeted to be sent; recording names of all servers to which the data was targeted to be sent; and/or recording all credentials used.

(4) In embodiments, monitoring module 110 executes the keystroke actions to determine the target of the attack. As examples: in embodiments, if monitoring module 110 finds network commands, then monitoring module 110 flags the attack as a network attack; in embodiments, if monitoring module 110 detects a delete action, then monitoring module 110 flags the attack as a data integrity attack; and in embodiments, if monitoring module 110 detects an encryption action, then monitoring module 110 flags the attack as an availability or ransomware attack.

(5) In embodiments, monitoring module 110 sends dummy data to the instigator of the attack to gather more threat intelligence. For example, in embodiments, monitoring module 110 sends credentials that allow access to sandbox 120, where sandbox 120 collects intelligence from the unauthorized user and also occupies the unauthorized user's attention to waste the unauthorized user's time and other resources.

FIG. 5 shows a flowchart of an exemplary method in accordance with aspects of the present invention. Steps of the method may be carried out in the environment of FIG. 4 and are described with reference to elements depicted in FIG. 4.

At step 505, the system detects connection of a universal serial bus device to a computer. In embodiments, and as described with respect to FIG. 4, the monitoring module 110 detects connection of a USB device 320 to computer 310.

At step 510, the system determines that the computer is in a locked mode. In embodiments, and as described with respect to FIG. 4, monitoring module 110 determines that computer 310 is in a locked mode.

At step 515, the system detects input to the computer within a predetermined time of detecting the connection. In embodiments, and as described with respect to FIG. 4, monitoring module 110 detects input to computer 310 within a predetermined time of detecting the connection of USB device to computer 310.

At step 520, the system determines, as a result of the computer being locked and detecting the input, that the input is a threat to the computer. In embodiments, and as described with respect to FIG. 4, monitoring module 110 determines, as a result of computer 310 being locked and detecting the input, that the input is a threat to the computer.

At step 525, the system creates a temporary virtual environment. In embodiments, and as described with respect to FIG. 4, monitoring module 110 creates sandbox 120.

At step 530, the system receives the input into the temporary virtual environment. In embodiments, and as described with respect to FIG. 4, monitoring module 110 receives the input into sandbox 120.

At step 535, the system processes the input in the temporary virtual environment. In embodiments, and as described with respect to FIG. 4, monitoring module 110 processes the input in sandbox 120.

At step 540, the system determines that the threat is targeted at a server to which the computer has access. In embodiments, and as described with respect to FIG. 4, monitoring module 110 determines that the threat is targeted at a server to which computer 310 has access.

At step 545, the system records information related to the input. In embodiments, and as described with respect to FIG. 4, monitoring module 110 records information related to the input.

At step 550, the system sends, to an instigator of the threat, credentials that allow access to the temporary virtual environment. In embodiments, and as described with respect to FIG. 4, monitoring module 110 sends, to an instigator of the threat, credentials that allow access to sandbox 120. These credentials appear to the instigator to be credentials to enter computer 310 and mislead the instigator into believing that the instigator has normally accessed computer 310 when the instigator has only gained access to the controlled environment of sandbox 120.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   detecting, by a computing device, an input to a computer in a locked mode, wherein the input to the computer is a threat;
   creating, by the computing device, a temporary virtual environment protecting the computer in the locked mode, in response to the detecting the input;
   receiving, by the computing device, the input into the temporary virtual environment;
   processing, by the computing device, the input in the temporary virtual environment;
   recording, by the computing device, information related to the input;
   identifying, by the computing device, an instigator of the threat based on the recording; and
   sending dummy data, by the computing device, to the instigator of the threat in order to gather additional threat intelligence from the instigator.

2. The method of claim 1, wherein the input comprises keystrokes received by the computer.

3. The method of claim 1, wherein the input comprises commands from the universal serial bus device.

4. The method of claim 1, wherein the detecting the input to the computer in the locked mode comprises comparing the input to a known input, wherein the known input corresponds to a known threat.

5. The method of claim 1, further comprising determining, by the computing device, that the threat is targeted at a server to which the computer has access.

6. The method of claim 5, wherein the determining that the threat is targeted at a server to which the computer has access comprises determining that the threat comprises a specific internet protocol address of the server.

7. The method of claim 6, wherein the recording information comprises recording the specific internet protocol address of the server.

8. The method of claim 5, wherein the determining that the threat is targeted at a server to which the computer has access comprises determining that the threat comprises a specific and valid user/password combination.

9. The method of claim 5, wherein the recording information comprises recording a name of the server.

10. The method of claim 1, further comprising sending, by the computing device and to the instigator of the threat, fake credentials that allow access to the temporary virtual environment to waste time and resources of the instigator.

11. A computer program product comprising one or more computer readable storage media having program instructions collectively stored on the one or more computer readable storage media, the program instructions executable to:
   detect an input to a computer in a locked mode, wherein the input to the computer is a threat;
   create a temporary virtual environment to gather threat intelligence by processing the input in a similar manner to that of normal operation, the temporary virtual environment protecting the computer in the locked mode, in response to the detecting the input;
   receive the input into the temporary virtual environment;
   process the input in the temporary virtual environment;
   identifying, by the computing device, an instigator of the threat based on the recording; and
   send dummy data to the instigator of the threat in order to gather additional threat intelligence from the instigator.

12. The computer program product of claim 11, wherein the input comprises commands from the universal serial bus device.

13. The computer program product of claim 11, wherein the detecting the input to the computer in the locked mode comprises comparing the input to known input, wherein the known input corresponds to a known threat.

14. The computer program product of claim 11, wherein the program instructions are further executable to determine that the threat is targeted at a server to which the computer has access.

15. The computer program product of claim 11, wherein the program instructions are further executable to send, to the instigator of the threat, fake credentials that allow access to the temporary virtual environment to waste time and resources of the instigator.

16. A system comprising:
   a processor, a computer readable memory, one or more computer readable storage media, and program instructions collectively stored on the one or more computer readable storage media, the program instructions executable to:
   detect an input to a computer in a locked mode, wherein the input to the computer is a threat;
   create a temporary virtual environment to gather threat intelligence by processing the input in a similar manner to that of normal operation, the temporary virtual environment protecting the computer in the locked mode, in response to the detecting the input;
   receive the input into the temporary virtual environment;
   process the input in the temporary virtual environment;
   identifying, by the computing device, an instigator of the threat based on the recording; and
   send dummy data to the instigator of the threat in order to gather additional threat intelligence from the instigator.

17. The system of claim 16, further comprising program instructions executable to determine that the threat is targeted at a server to which the computer has access.

18. The system of claim 17, wherein the determining that the threat is targeted at a server to which the computer has access comprises determining that the threat comprises a specific internet protocol address of the server.

19. The system of claim 17, wherein the determining that the threat is targeted at a server to which the computer has access comprises determining that the threat comprises a specific and valid user/password combination.

20. The system of claim 16, further comprising program instructions executable to send, to the instigator of the threat, fake credentials that allow access to the temporary virtual environment to waste time and resources of the instigator.

\* \* \* \* \*